(12) United States Patent
Mishima et al.

(10) Patent No.: US 7,884,981 B2
(45) Date of Patent: Feb. 8, 2011

(54) USER INTERFACE DEVICE THAT SETS PROCESSING MODE, IMAGE PROCESSING APPARATUS THAT INCLUDES SUCH USER INTERFACE DEVICE, AND PROCESSING MODE SETTING METHOD

(75) Inventors: Kimie Mishima, Itami (JP); Kazuo Inui, Itami (JP); Yoshiki Tokimoto, Nishiwaki (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1070 days.

(21) Appl. No.: 11/304,908

(22) Filed: Dec. 16, 2005

(65) Prior Publication Data

US 2006/0242579 A1     Oct. 26, 2006

(30) Foreign Application Priority Data

Apr. 21, 2005   (JP) .............................. 2005-123451

(51) Int. Cl.
  *G03F 3/10*    (2006.01)
  *G06F 3/12*    (2006.01)
  *G06K 15/00*   (2006.01)

(52) U.S. Cl. ...................... 358/527; 358/1.13; 358/1.18

(58) Field of Classification Search ................. 358/527, 358/453, 403, 404, 448, 452, 1.13, 474, 444, 358/540, 1.18, 1.15, 1.1, 1.16; 382/317, 382/292, 309, 295, 306; 399/15, 408, 402, 399/410; 345/118, 121, 763, 717, 733, 736, 345/737, 738, 739, 740, 746, 748, 804, 805, 345/762, 764, 771

See application file for complete search history.

(56) References Cited

U.S. PATENT DOCUMENTS 6,473,539 B1 * 10/2002 Koga .......................... 382/317
6,642,943 B1 * 11/2003 Machida ..................... 715/763
7,120,470 B2   10/2006 Oota et al.
7,466,432 B2 * 12/2008 Mitani ........................ 358/1.1

FOREIGN PATENT DOCUMENTS

JP      7-319343      12/1995
JP      2000-181657    6/2000

(Continued)

OTHER PUBLICATIONS

Japanese Notice on Reason for Rejection, mailed Mar. 25, 2008, directed to counterpart Japanese Patent Application No. JP2005-123451. 6 pages.

(Continued)

*Primary Examiner*—Charlotte M Baker
(74) *Attorney, Agent, or Firm*—Morrison & Foerster LLP

(57) ABSTRACT

In order to enable a user to easily and quickly set the processing mode, the user interface device sets the processing mode for job execution in an image processing apparatus. This user interface device includes specifying means that specifies the processing modes presented to the user prior to processing mode setting as presentation processing modes, generating means that generates presentation preview images indicating processing results when the image data is processed using the presentation processing modes, display means that displays the generated presentation preview images, and setting means that sets in the image processing apparatus the processing modes corresponding to the displayed presentation preview images.

30 Claims, 11 Drawing Sheets

FOREIGN PATENT DOCUMENTS

| | | |
|---|---|---|
| JP | 2001-243031 | 9/2001 |
| JP | 2003-78868 | 3/2003 |
| JP | 2003-110659 | 4/2003 |
| JP | 2003-233799 | 8/2003 |
| JP | 2003-296060 | 10/2003 |
| JP | 2003-296090 | 10/2003 |
| JP | 2004-70661 | 3/2004 |
| JP | 2004-78997 | 3/2004 |
| JP | 2005-55719 | 3/2005 |

OTHER PUBLICATIONS

Japanese Office Action, mailed Jul. 22, 2008, directed to counterpart Japanese Patent Application No. 2005-123451; 6 pages.

* cited by examiner

USER INTERFACE DEVICE THAT SETS PROCESSING MODE, IMAGE PROCESSING APPARATUS THAT INCLUDES SUCH USER INTERFACE DEVICE, AND PROCESSING MODE SETTING METHOD

This application is based on Japanese Patent Application No. 2005-123451 filed in Japan on Apr. 24, 2005, the entire content of which is hereby incorporated by reference.

BACKGROUND OF THE INVENTION

1. Field of the Invention

The present invention relates to a user interface used to set a processing mode in an image processing apparatus, for example.

2. Description of the Related Art

In recent years, image processing apparatuses have acquired an increasing number of functions, as exemplified by a multifunction peripheral, for example. Therefore, users are forced to find a way to select and set the desired processing mode from among multiple processing modes that define print processing and subsequent processing. In such an image processing apparatus, setting errors may result in deviations between the processing result sought by the user and the actual result of processing. Therefore, conventional image processing apparatuses include an apparatus that displays a preview of the expected completed image on the recording paper prior to actual processing (see, for example, Japanese Patent Laid-Open No. 2003-296090) and an apparatus that displays possible stapling positions as selection options where the stapling function has been selected (see, for example, Japanese Patent Laid-Open No. 2004-078997).

According to the conventional image processing apparatuses described above, the user can check and confirm the set processing mode prior to processing. However, because the conventional image processing apparatuses have a number of available processing modes, the problem exists that it is difficult for the user to select the desired processing mode from among such modes. For example, where the user wishes to select two-sided printing and stapling for a given image, the user must search for the desired processing mode while switching screens on the display panel several times. When this is carried out, if there are numerous available modes, it takes a long time to find the desired processing mode. Another problem is that printing of the image must be begun without the user being able to select the desired processing mode.

With the conventional image processing apparatuses, while a preview of the expected completed image is displayed on the recording paper prior to actual processing, or the available stapling positions are displayed as selection options, these processes take place after the processing mode has already been set, which does not resolve the problems described above.

OBJECT AND SUMMARY

An object of the present invention is to resolve the problems described above. In other words, an object of the present invention is to provide a user interface device and method that enable the user to easily and quickly set the processing mode.

The above object is realized via the following construction.

A first user interface device pertaining to the present invention is a user interface device that sets in an image processing apparatus the processing mode to execute a job. This user interface device includes a specifying unit that specifies the processing modes to be presented to the user prior to setting of the processing mode as presentation processing modes, a generating unit that generates presentation preview images showing the results of processing of the image data using these processing modes, a display unit that displays the generated presentation preview images, and a setting unit that sets in the image processing apparatus the processing modes corresponding to the displayed presentation preview images.

It is preferred that the specifying unit in the first user interface device specify the presentation processing modes based on at least one processing mode set at the time of execution of a job by the image processing apparatus prior to such specification. This user interface device will hereinafter be termed a 'second user interface device'.

It is preferred that in the first user interface device, the presentation processing modes be specified based on at least one processing mode registered in advance in the image processing apparatus. This user interface device will hereinafter be termed a 'third user interface device'.

It is preferred that any of the first through third user interface devices further include a selection unit by which the user selects one presentation preview image from among the multiple displayed presentation preview images. The specifying unit specifies the multiple processing modes as the presentation processing modes, the generating unit generates a presentation preview image for each of the specified multiple presentation processing modes, the display unit displays the generated multiple presentation preview images, and the setting unit sets in the image processing apparatus the processing mode corresponding to the presentation preview image selected via the selection unit. This user interface device will hereinafter be termed a 'fourth user interface device'.

It is preferred that the processing modes in the first through fourth user interface devices include parameter values corresponding to each of the multiple processing functions. This user interface device will hereinafter be termed a 'fifth user interface device'.

It is preferred that the processing modes in the fifth user interface devices include all parameter values required by the image processing apparatus when executing a job. This user interface device will hereinafter be termed a 'sixth user interface device'.

It is preferred that the first user interface device further include an error processing storage unit that stores and associates job errors with processing modes to clear those errors, wherein the specifying unit specifies depending on the error occurring in the image processing apparatus processing modes to clear such error as specified processing modes, the generating unit generates specified preview images indicating the results of processing when the image data is processed under the specified processing modes, the display unit displays the generated specified preview images, and the setting unit sets in the image processing apparatus the processing modes corresponding to the displayed specified preview images. This user interface device will hereinafter be termed a 'seventh user interface device'.

It is preferred that the first user interface device further include an error processing storage unit that stores and associates job errors and multiple processing modes to clear these errors, wherein the specifying unit specifies depending on the error occurring in the image processing apparatus multiple processing modes to clear such error as specified processing modes, the generating unit generates specified preview images for each of the specified multiple specified processing modes, the display unit displays the generated multiple specified preview images, and that the first user interface device further include a selection unit by which the user selects one of the specified preview images from among the displayed multiple specified preview images, and the setting unit sets in the image processing apparatus the processing mode corresponding to the specified preview image selected via the selection unit. This user interface device will hereinafter be termed an 'eighth user interface device'.

It is preferred that the fourth user interface device further include a parameter mode storage unit that stores at least one parameter mode that prescribes for each presentation processing mode a detailed setting for that mode, wherein the generating unit generates parameter preview images that indicate the results of processing when the image data is processed under at least one stored parameter mode in connection with the presentation processing mode corresponding to the presentation preview image selected via the selection unit, the display unit displays at least one generated parameter preview image, the selection unit selects one preview image from among at least one displayed parameter preview image, and the setting unit sets in the image processing apparatus the parameter mode corresponding to the selected parameter preview image. This user interface device will hereinafter be termed a 'ninth user interface device'.

It is preferred that the generating unit of each of the first through ninth user interface devices generate the presentation preview images based on image data that is to undergo processing by the image processing apparatus. This user interface device will hereinafter be termed a 'tenth user interface device'.

It is preferred that the generating unit of each of the first through ninth user interface devices generate the presentation preview images based on image data stored in advance. This user interface device will hereinafter be termed an 'eleventh user interface device'.

It is preferred that the generating unit of the seventh or eighth user interface devices generate the specified preview images based on image data that is to undergo processing by the image processing apparatus. This user interface device will hereinafter be termed a 'twelfth user interface device'.

It is preferred that the generating unit of the seventh or eighth user interface devices generate the specified preview images based on image data stored in advance. This user interface device will hereinafter be termed a 'thirteenth user interface device'.

It is preferred that the generating unit of the ninth user interface device generate the parameter preview images based on image data that is to undergo processing by the image processing apparatus. This user interface device will hereinafter be termed a 'fourteenth user interface device'.

It is preferred that the generating unit of the ninth user interface device generate the parameter preview images based on image data stored in advance. This user interface device will hereinafter be termed a 'fifteenth user interface device'.

The image processing apparatus pertaining to the present invention includes any of the first through fifteenth user interface devices.

A first user interface method pertaining to the present invention is a user interface method that sets in an image processing apparatus the processing mode to execute a job. This user interface method includes a presentation processing mode specifying step that specifies the processing modes to be presented to the user prior to setting of the processing mode as presentation processing modes, a presentation preview image generating step that generates presentation preview images showing the results of processing of the image data using these processing modes, a presentation preview image display step that displays the generated presentation preview images, and a presentation processing mode setting step that sets in the image processing apparatus the processing modes corresponding to the displayed presentation preview images.

It is preferred that the presentation processing mode specifying step of the first user interface method specify the presentation processing modes based on at least one processing mode set at the time of execution of a job by the image processing apparatus prior to such specification. This user interface method will hereinafter be termed a 'second user interface method'.

It is preferred that the presentation processing mode specifying step of the first user interface method specify the presentation processing modes based on at least one processing mode registered in advance in the image processing apparatus. This user interface method will hereinafter be termed a 'third user interface method'.

It is preferred that the first through third user interface methods described above each further include a presentation preview image selection step by which the user selects one of the presentation preview images from among the multiple presentation preview images displayed in the above presentation preview image display step, wherein the presentation processing mode specifying step specifies multiple processing modes as presentation processing modes, the presentation preview image generating step generates a presentation preview image for each of the specified multiple presentation processing modes, the presentation preview image display step displays the generated multiple presentation preview images, and the presentation processing mode setting step sets in the image processing apparatus the processing mode corresponding to the presentation preview image selected in the presentation preview image selection step. This user interface method will hereinafter be termed a 'fourth user interface method'.

It is preferred that the processing modes in the first through fourth user interface methods each include parameter values corresponding to each of the multiple processing functions. This user interface method will hereinafter be termed a 'fifth user interface method'.

It is preferred that the processing modes in the fifth user interface method include all parameter values required by the image processing apparatus when executing a job. This user interface method will hereinafter be termed a 'sixth user interface method'.

It is preferred that the first user interface method further include an error processing storage step that stores and associates job errors with processing modes to clear those errors, a specified processing mode specifying step that specifies, depending on the error occurring in the image processing apparatus, processing modes to clear such error as specified processing modes, a specified preview image generating step that generates specified preview images indicating the results of processing when the image data is processed under the specified processing modes, a display step that displays the generated specified preview images, and a specified processing mode setting step that sets in the image processing apparatus the processing modes corresponding to the displayed specified preview images. This user interface method will hereinafter be termed a 'seventh user interface method'.

It is preferred that the first user interface method further include an error processing storage step that stores and associates job errors and multiple processing modes to clear these errors, a specified processing mode specification step that specifies, depending on the error occurring in the image processing apparatus, multiple processing modes to clear such error as specified processing modes, a specified preview image generating step that generates a specified preview image for each of the specified multiple specified processing modes, a specified preview image display step that displays the generated multiple specified preview images, a specified preview image selection step in which the user selects one specified preview image from among the displayed multiple specified preview images, and a specified processing mode setting step that sets in the image processing apparatus the processing mode corresponding to the specified preview image selected via the selection unit. This user interface method will hereinafter be termed an 'eighth user interface method'.

It is preferred that the fourth user interface method further include a parameter mode storage step that stores at least one parameter mode that prescribes for each presentation processing mode a detailed setting for that mode, a parameter preview image generating step that generates parameter preview images that indicate the results of processing when the image data is processed under at least one stored parameter mode in connection with the presentation processing mode corresponding to the presentation preview image selected via in the presentation preview image selection step, a parameter preview image display step that displays at least one generated parameter preview image, a parameter preview image selection step that selects one parameter preview image from among at least one displayed parameter preview image, and a parameter mode setting step that sets in the image processing apparatus the parameter mode corresponding to the selected parameter preview image. This user interface method will hereinafter be termed a 'ninth user interface method'.

It is preferred that the presentation preview image generating step of any of the first through ninth user interface methods generate presentation preview images based on image data that is to undergo processing by the image processing apparatus.

It is preferred that the presentation preview image generating step of any of the first through ninth user interface methods generate presentation preview images based on image data stored in advance.

It is preferred that the specified preview image generating step of the seventh or eighth user interface methods generate the specified preview images based on image data that is to undergo processing by the image processing apparatus.

It is preferred that the specified preview image generating step of the seventh or eighth user interface methods generate the specified preview images based on image data stored in advance.

It is preferred that the parameter preview image generating step of the ninth user interface method generate the parameter preview images based on image data that is to undergo processing by the image processing apparatus.

It is preferred that the parameter preview image generating step of the ninth user interface method generate the parameter preview images based on image data stored in advance.

According to the present invention, the user can set the processing mode easily and quickly.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Embodiments of the present invention will be described below with reference to the attached drawings.

The user interface device according to the present invention includes a display panel for an image processing apparatus as well as a terminal display connected to the image processing apparatus over a network or the like, and can present to the user the available processing modes for the image processing apparatus prior to the setting thereof. When this is done, the presentation processing modes do not comprise all processing modes that may be set on the image processing apparatus, but rather processing modes that are specified based on the processing modes used in the past by that user or processing modes registered in advance. Where only one processing mode is presented, the user can set the processing mode by confirming that processing mode, while where multiple processing modes are presented, the processing mode can be set by selecting from among the displayed presentation processing modes. Consequently, the processing mode can be set easily and quickly. A multifunction peripheral comprising an example of an image processing apparatus will be described below.

Embodiment 1

Figure 1:
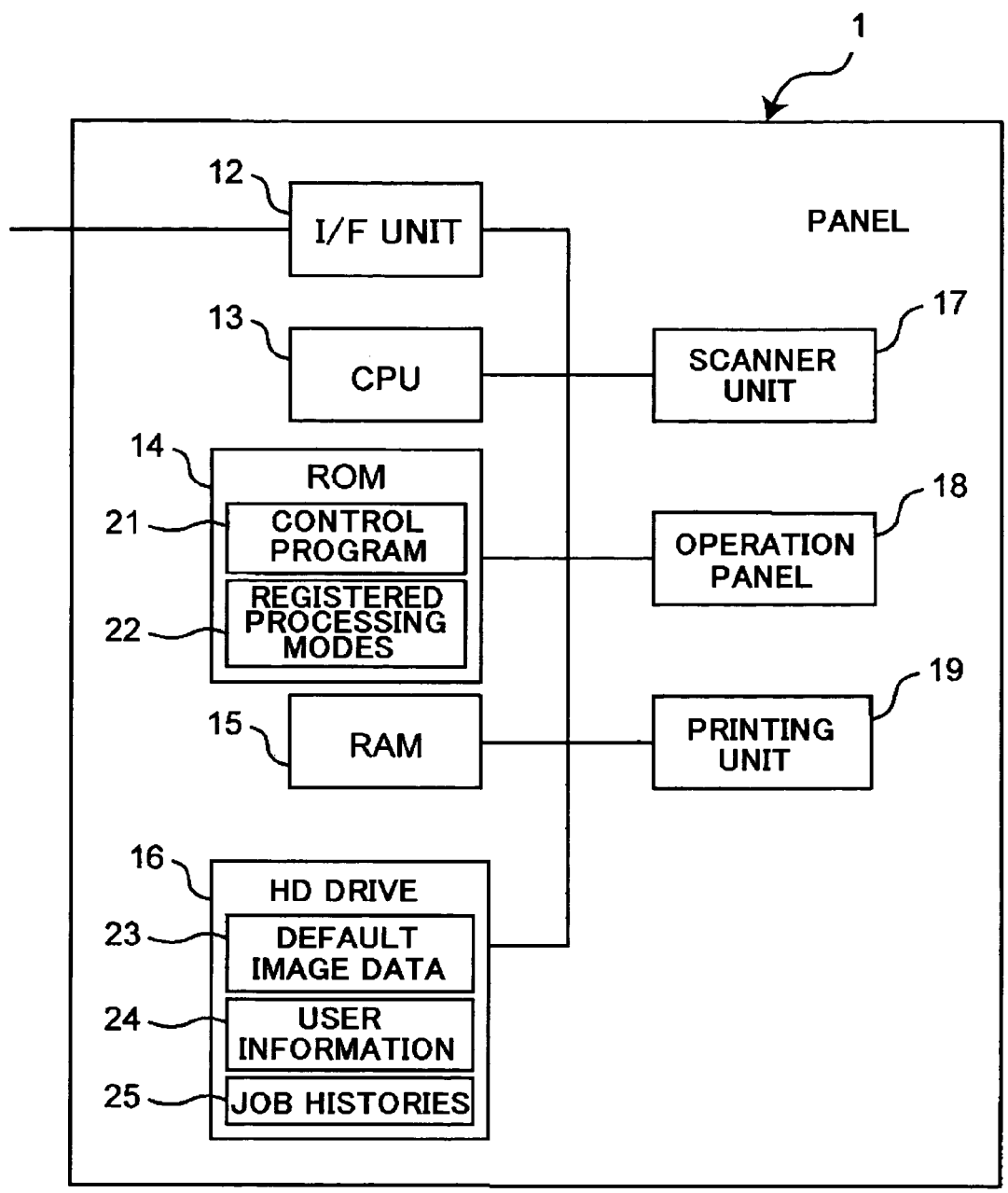
FIG. 1 is a block diagram showing an example of the hardware construction of a multifunction peripheral according to an Embodiment 1 of the present invention.

FIG. 1 is a block diagram showing an example of the hardware construction of a multifunction peripheral according to an Embodiment 1 of the present invention. As shown in FIG. 1, the multifunction peripheral 1 of this Embodiment 1 includes a network interface unit (hereinafter 'I/F unit') 12, a central processing unit (CPU) 13, a read-only memory (ROM) 14, a random-access memory (RAM) 15, a hard disk (HD) drive 16, a scanner unit 17, an operation panel 18 and a printing unit 19. The I/F unit 12 sends and receives data among the terminals connected to the multifunction peripheral 1 over the network. The ROM 14 stores a control program 21 and a registered processing mode 22 comprising a processing mode registered in advance. The CPU 13 retrieves and executes the control program 21 stored in the ROM 14. The RAM 15 temporarily stores processing data and the like.

In the multifunction peripheral 1 according to this Embodiment 1, the ROM 14 is a programmable ROM in which the data can be overwritten, but it may also comprise a mask ROM in which the data cannot be overwritten. In this case, the registered processing mode 22 is stored on the hard disk drive 16.

The hard disk drive 16 stores default image data 23, user information 24 that includes user ID and password information used to specify the user, and past job history 25 for each registered user. The scanner unit 17 reads drawings and photographs from an original document image and converts them into image data.

The operation panel 18 is a panel by which the user can issue various operation instructions to the multifunction peripheral 1, and includes operation keys and a display device. The operation keys comprise operation keys by which the user can issue instructions to perform scanning, copying or other processes, as well as a ten-key keypad by which user information can be input. The display device can display preview images and the like and includes a touch panel function that enables necessary instructions to be input by touching the touch panel. The printing unit 19 prints onto recording paper image data obtained from the I/F unit 12, the scanner unit 17 or the like when a printing instruction is input from the operation panel 18, and carries out after-processing such as stapling where necessary.

Figure 2:
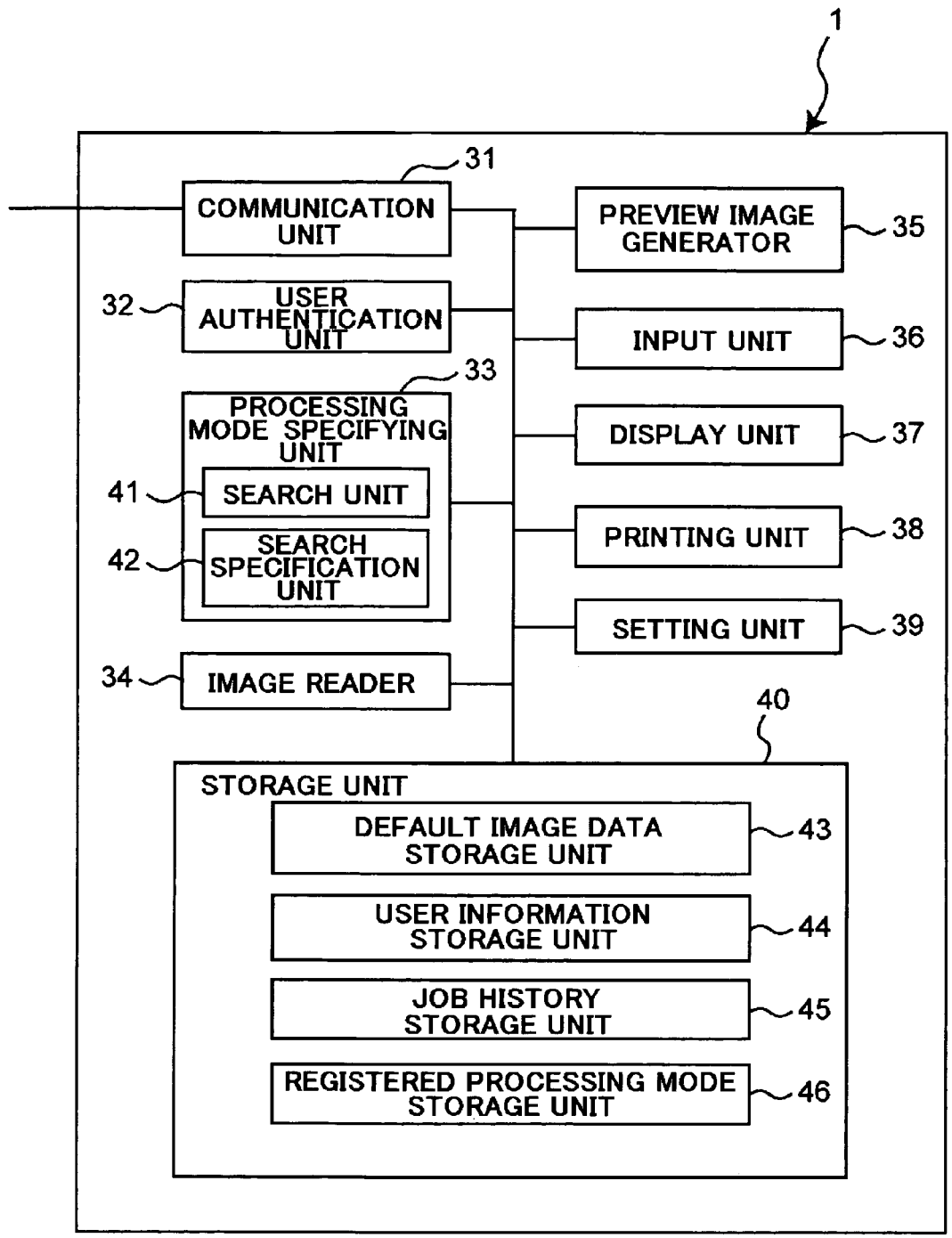
FIG. 2 is a block diagram showing an example of the function construction of the multifunction peripheral according to the Embodiment 1 of the present invention.

FIG. 2 is a block diagram showing an example of the function construction of the multifunction peripheral 1 shown in FIG. 1. The multifunction peripheral 1 includes a communication unit 31, a user authentication unit 32, a processing mode specifying unit 33, an image reader 34, a preview image generator 35, an input unit 36, a display unit 37, a printing unit 38, a setting unit 39 and a storage unit 40, as shown in FIG. 2. The processing mode specifying unit 33 includes a search unit 41 and a search specification unit 42. The storage unit 40 includes a default image data storage unit 43, a user information storage unit 44, a job history storage unit 45 (which stores history information for jobs previously executed by the multifunction peripheral 1, as well as information pertaining to users executing the jobs and the processing mode employed when each job was executed), and a registered processing mode storage unit 46. The communication unit 31, image reader 34 and printing unit 38 correspond to the I/F unit 12, scanner unit 17 and printing unit 19 shown in FIG. 1, respectively. The input unit 36 and display unit 37 correspond to the operation panel 18. The storage unit 40 corresponds to the ROM 14 and the hard disk drive 16. The user authentication unit 32, processing mode specifying unit 33, preview image generator 35 and setting unit 39 are realized by the CPU 13, ROM 14 and RAM 15.

The user authentication unit 32 carries out user authentication to verify whether or not the user seeking to use the multifunction peripheral 1 is a registered user. Specifically, it determines whether or not the user is a registered user based on whether or not the user information input via the input unit 36 matches the user information stored in the user information storage unit 44. The processing mode specifying unit 33 specifies the processing modes to be presented to the user (hereinafter the 'presentation processing modes'). In the discussion below, the processing mode specifying unit 33 is described as specifying the presentation processing modes only to a user that successfully completes user authentication. Specifically, the search unit 41 searches for the job history of the authenticated user within the job history storage unit 45, and the search specification unit 42 specifies the processing modes extracted from this searched for job history as the presentation processing modes. Where there is no job history for the authenticated user within the job history storage unit 45, the search unit 41 may search among processing modes stored in the registered processing mode storage unit 46. Where neither a job history nor a previously-registered processing mode exists, the currently set processing mode may be specified as the presentation processing mode. The preview image generator 35 generates a preview image for each processing mode specified by the processing mode specifying unit 33 as a presentation processing mode. Specifically, it generates a preview image showing the results of processing when image data comprising (i) default image data stored in the default image data storage unit 43, (ii) image data received via the communication unit 31 or (iii) image data obtained via conversion by the image reader 34, is processed in the various presentation processing modes. The display unit 37 displays the various preview images generated by the preview image generator 35. The user can use the input unit 36 to select one of these images displayed by the display unit 37. In other words, the user can set the processing mode by selecting a processing mode from among the available presentation processing modes. In addition, the input unit 36 comprises a selection unit by which one of the multiple displayed preview images can be selected.

Figure 3:
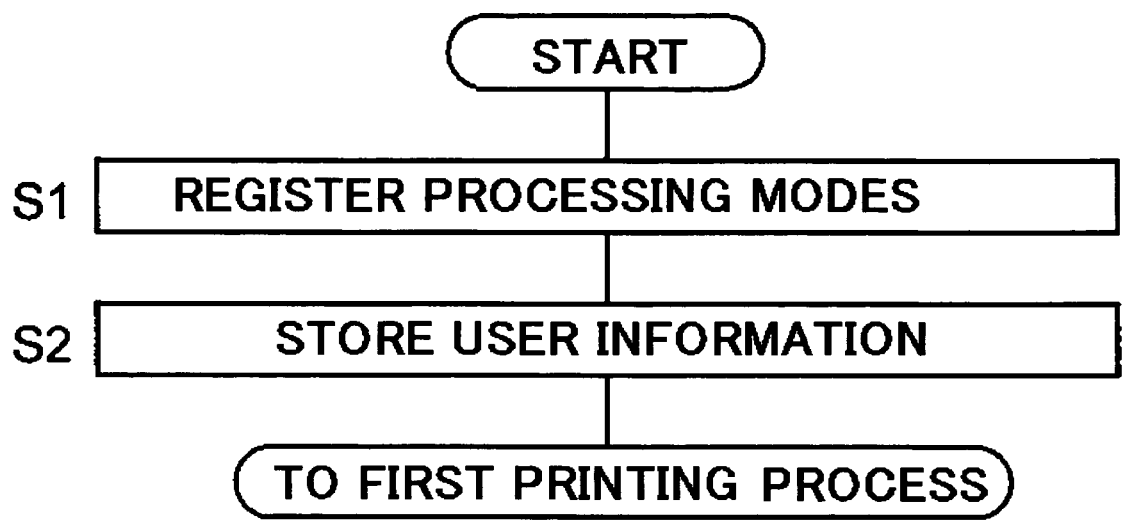
FIG. 3 is a flow chart to describe the pre-processing required in order to execute a first printing process.

A first printing process executed by the multifunction peripheral 1 according to this Embodiment 1 will now be described. In this first printing process, one or more processing modes are presented to an authenticated user. Where there are multiple presentation processing modes, the user can set the processing mode to be used during the actual printing process by selecting one of these presentation processing modes, while if there is only one presentation processing mode, the user can set the processing mode by confirming that processing mode. FIG. 3 is a flow chart describing the pre-processing required in order to execute the first printing process. As shown in FIG. 3, first where a processing mode is registered in advance, this processing mode is stored in the ROM 14 serving as a settings memory (program memory) (step S1). Furthermore, for each registered user to undergo user authentication, user information such as a user ID and password to specify the user is stored on the hard disk drive 16 (step S2). Here, the CPU 13 stores on the hard disk drive 16 such user information received via the I/F unit 12 or input from the operation panel 18. After this pre-processing is completed, the CPU 13 executes the first printing process in accordance with the control program 21. In the description of this Embodiment 1, the user information is deemed to consist of a user ID and password.

Figure 4:
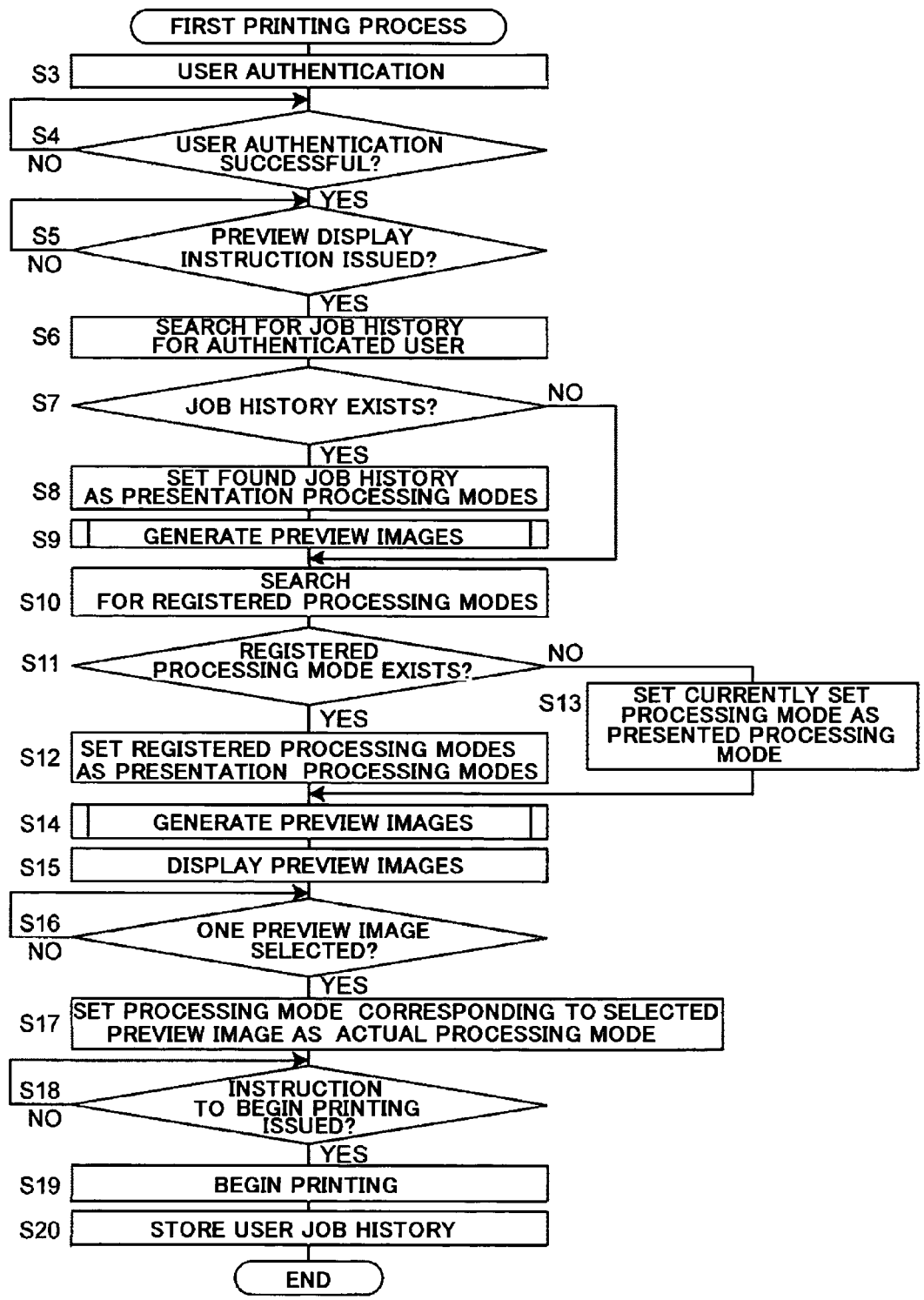
FIG. 4 is a flow chart to describe the first printing process.

FIG. 4 is a flow chart to describe the first printing process. As shown in FIG. 4, when the user performs login using the operation panel 18 (corresponding to the 'input unit 36'in FIG. 2), i.e., when the user inputs a user ID and password from the operation panel 18, the CPU 13 (corresponding to the 'user authentication unit' in FIG. 2) carries out user authentication by comparing the user-input user ID and password with the user IDs and passwords stored in the hard disk drive 16 (corresponding to the 'user information storage unit 44' in FIG. 2) (step S3). If user authentication fails (NO in step S4), the CPU 13 returns to step S3 and waits for user input of user information. If user authentication is successful (YES in step S4), the CPU 13 proceeds to step S5.

In step S5, the CPU 13 determines whether an instruction for preview display has been issued (step S5). For example, if an operation key on the operation panel 18 has been pressed to instruct preview display, it is determined that a preview display instruction has been issued (YES in step S5) and the CPU 13 proceeds to step S6. In step S6, the CPU 13 (corresponding to the 'search unit 41' in FIG. 2) searches for the job history corresponding to the user authenticated in step S4 from among the job histories stored on the hard disk drive 16 (corresponding to the 'job history storage unit 45' in FIG. 2) (step S6). If there is no such job history stored on the hard disk drive 16 (NO in step S7), the CPU 13 advances to step S10. However, if a job history for the authenticated user does exist on the hard disk drive 16 (YES in step S7), the CPU 13 (corresponding to the 'search specification unit 42' in FIG. 2) retrieves from the job history stored on the hard disk drive 16 the processing mode, i.e., the processing mode previously set by the user, and specifies this retrieved processing mode as the presentation processing mode (step S8). Here, where there are multiple job history items corresponding to the authenticated user, the CPU 13 extracts the processing modes associated with the respective job history items and specifies all of the extracted processing modes as presentation processing modes. Next, the CPU 13 (corresponding to the 'preview image generator 35' in FIG. 2) generates a preview image ('presentation preview image') corresponding to each processing mode specified as a presentation processing mode in step S8 (step S9). This preview image generating process is described in detail below.

If there is no job history corresponding to the authenticated user (NO in step S7) and the preview image generating process of step S9 has been completed, the CPU 13 advances to step S10. In step S10, the CPU 13 searches for processing modes (referred to as 'registered processing modes') stored in the ROM 14 (corresponding to the 'registered processing mode storage unit 46' in FIG. 2) (step S10). If registered processing modes exist (YES in step S11), those registered processing modes are specified as presentation processing modes (step S12). On the other hand, if no registered processing mode is stored in the ROM 14 (NO in step S11), the currently selected processing mode is specified as the presentation processing mode (step S13). Here, the 'currently selected processing mode' is the processing mode selected using the operation panel 18 after the first printing process has begun but before preview display is instructed by the user, and is normally the default processing mode. However, if the user has changed part of the parameter values for the default processing mode after it is displayed, the post-change processing mode becomes the 'currently selected processing mode'. This 'currently selected processing mode' may be stored on the hard disk drive 16. In addition, it is also acceptable if the default processing mode is specified as the presentation processing mode only where no processing mode is previously set, such as when the multifunction peripheral 1 is turned ON, and in other cases the processing mode set immediately prior to this specification is specified as the presentation processing mode. Next, preview images corresponding to the processing modes specified as the presentation processing modes in step S12 or S13 are generated (step S14). This preview image generating process is identical to the preview image generating process of step S9.

The preview images generated in step S9 or step S14 are then displayed on the operation panel 18 (step S15). The user can use the operation panel 18 to select one of the displayed preview images. So long as no preview image is selected by the user (NO in step S16), these preview images are continuously displayed, while if a preview image is selected by the user (YES in step S16), the CPU 13 (corresponding to the 'setting unit 39' in FIG. 2) sets the processing mode corresponding to the selected preview image as the processing mode for actual processing (step S17). Where only one job history item is stored, or where the presentation processing mode is the currently selected processing mode, only one preview image is displayed. If only one preview image is displayed, the user specifies that preview image using the operation panel 18 after verifying the preview image. The processing mode corresponding to that preview image is then set as the processing mode for actual processing. Where the presentation processing mode is the currently selected processing mode, which is different from the default processing mode, both preview images may be displayed. When the user inputs an instruction via the operation panel 18 to begin the printing process (YES in step S18), the CPU 13 advances to the next step, wherein the printing unit 29 (corresponding to the 'printing unit 38' in FIG. 2) is caused to begin the printing process using the processing mode specified or selected by the user (step S19). The processing mode set in step S17 is then stored on the hard disk drive 16 (corresponding to the 'job history storage unit 45' in FIG. 2) as job history information for the user that underwent user authentication in step S4 (step S20), whereupon this series of processes ends.

Figure 5:
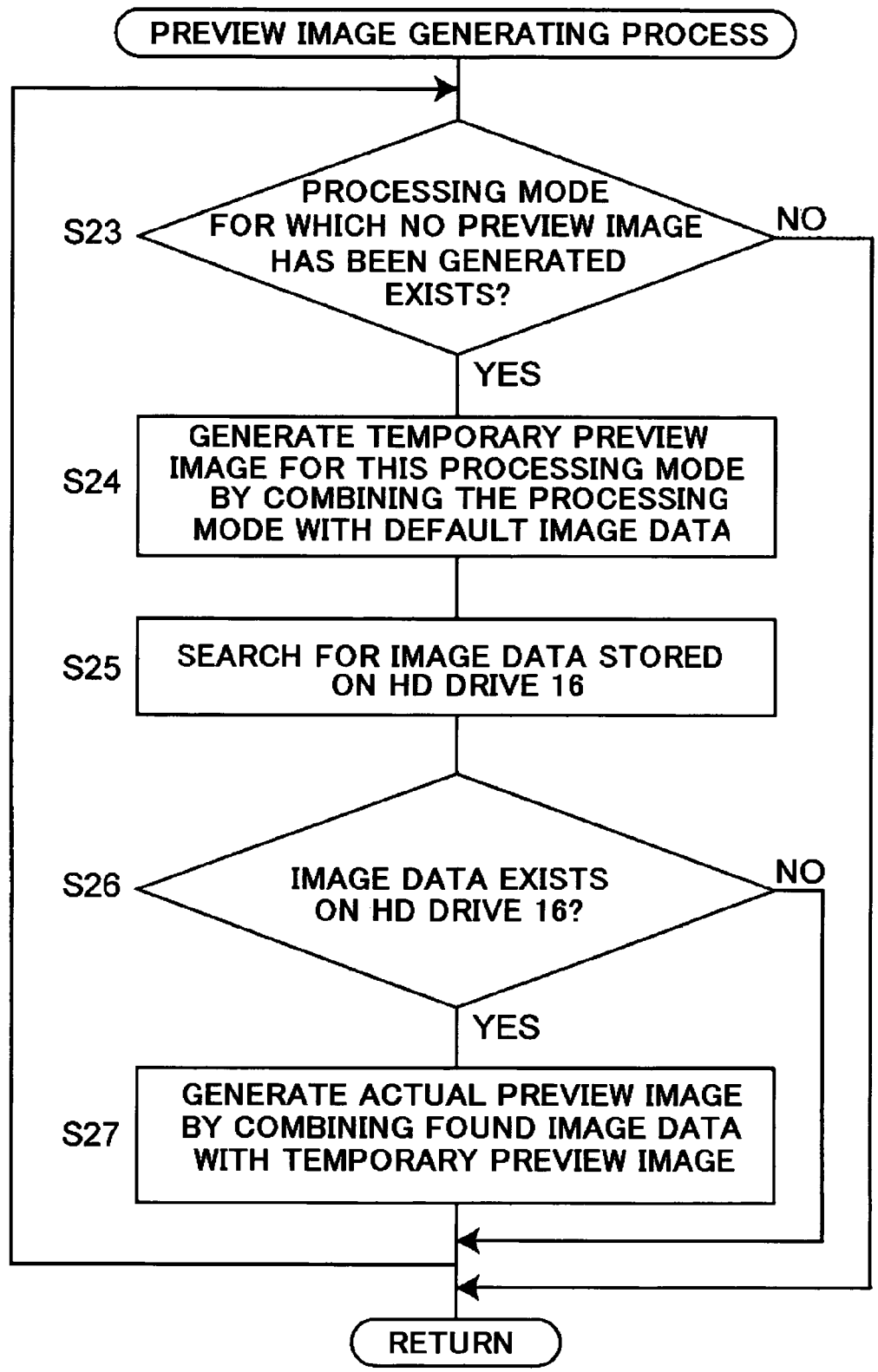
FIG. 5 is a flow chart to describe a preview image generating process.

The preview image generating process of steps S9 and S14 will now be described. FIG. 5 is a flow chart of the preview image generating process. As shown in FIG. 5, first, the CPU 13 determines whether or not the processing modes specified as presentation processing modes include a processing mode for which no preview image has been generated (step S23). If there is no processing mode for which a preview image has not been generated, i.e., if a preview image has been generated for all processing modes (NO in step S23), the preview image generating process is ended. If a processing mode for which no preview image has been generated (YES in step S23) exists, a temporary preview image is generated in accordance with that processing mode by combining that processing mode with the default image data (step S24). Specifically, the CPU 13 retrieves the default image data from the ROM 14 (corresponding to the 'default image data storage unit 43' in FIG. 2) and the processed image data corresponding to the processing mode for which the preview image is to be generated, and generates a temporary preview image by synthesizing together these two sets of data.

It is next determined whether or not the image data for the image to be processed by the user was obtained via the I/F unit 12 (corresponding to the 'communication unit 31' in FIG. 2) or the scanner unit 27 (corresponding to the 'image reader 34' in FIG. 2). Here, because image data obtained via the I/F unit 12 or the scanner unit 27 is stored on the hard disk drive 16, image data stored on the hard disk drive 16 is sought (step S25). Where image data exists on the hard disk drive 16 (YES in step S26), this image data is combined with the temporary preview image to generate an actual preview image (step S27), and the CPU 13 then returns to step S23 and repeats the steps from S23 to S27. If there is no image data on the hard disk drive 16, on the other hand (NO in step S26), the CPU 13 returns to step S23 immediately and repeats the steps from S23 to S27 once more. In this Specification, a 'preview image' includes both a 'temporary preview image' and an 'actual preview image'.

A temporary preview image was created using default image data in the preview image generating process shown in FIG. 5, but the actual preview image may be generated without generating a temporary preview image. In other words, it is acceptable if (i) the CPU 13 determines in the first step of the preview image generating process whether or not image data to be actually processed by the user exists on the hard disk drive 16, and (ii) if it is determined that such image data already exists on the hard disk drive 16, an actual preview image is generated by combining this image data and the processed image data corresponding to the presentation processing mode.

Figure 6:
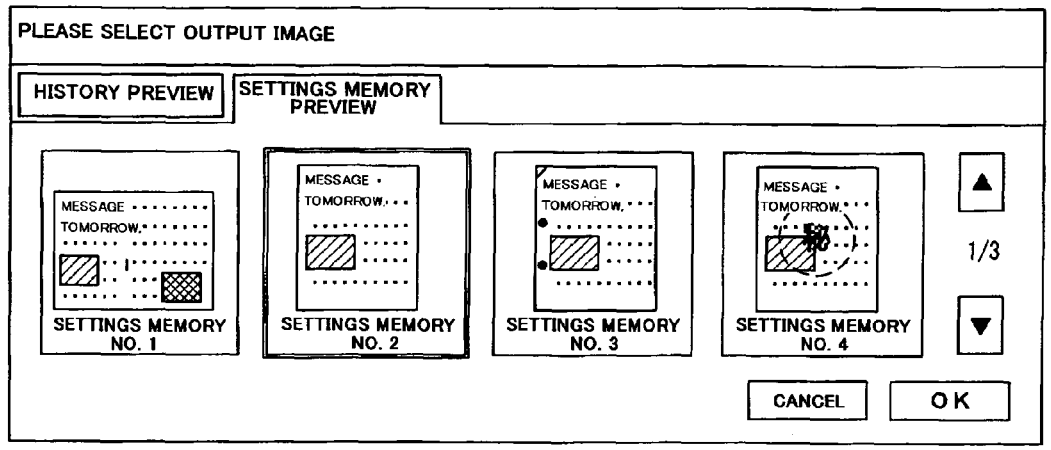
FIG. 6 is an example of the display of preview images displayed in the first printing process shown in FIG. 4.

FIG. 6 shows an example of the display of the generated preview images on the operation panel 18 (corresponding to the 'display unit 37' in FIG. 2). As shown in FIG. 6, the preview images based on the processing modes extracted from the user's job history are shown separately from the preview images based on the processing modes registered in the settings memory. In the display example shown in FIG. 6, preview images corresponding to the '2 in 1' print processing mode (settings memory No. 1), the standard printing process mode (settings memory No. 2), the two-point stapling printing process mode (settings memory No. 3) and the confidential printing process mode (settings memory No. 4) are displayed.

As shown in FIG. 6, in the multifunction peripheral 1 according to this Embodiment 1, the user-settable processing modes are presented as preview images showing the results of processing when the image data is processed using each processing mode. Because the user can set the processing mode by (i) where only one processing mode is presented, confirming that processing mode, and (ii) where multiple processing modes are presented, selecting one of the displayed presentation processing modes, the processing mode can be easily and quickly set. Furthermore, because the user can select the processing mode while verifying a finished expected image, deviations between the processing result expected by the user and the processing result from actual processing can be prevented.

Furthermore, according to the multifunction peripheral 1 of this Embodiment 1, because the presentation processing modes are specified using the user's job history, the processing mode that is expected to be selected by the user can be given priority in presentation, and the inconvenience of requiring the user to search among a large number of processing modes in order to select a processing mode can be eliminated.

In many recent image processing apparatuses, the operation panel 18 often performs display in color. As a result, the displayed preview images are clear enough to permit the user to realistically visualize the actual processing results by viewing the displayed preview images. Therefore, as in the multifunction peripheral 1 of this Embodiment 1, displaying the preview images in accordance with the processing modes is extremely useful for the user.

In the image processing apparatus according to the Embodiment 1 described above, the set processing mode may correspond to a single processing function such as two-sided printing or staple printing, but it may alternatively include parameter values corresponding to multiple different processing functions. It may also include all parameter values required by the image processing apparatus when executing a job.

Embodiment 2

An image processing apparatus according to an Embodiment 2 of the present invention will now be described. The image processing apparatus according to the Embodiment 2 differs from the image processing apparatus according to the Embodiment 1 in that the preview images corresponding to the processing modes are displayed in stages. Specifically, multiple rough preview images corresponding to processing modes such as two-sided printing and staple printing are displayed, and after the user-selects one of these preview images, after the user selects one of these preview images, a preview image in accordance with the detailed settings regarding the selected processing mode is displayed. For example, where staple printing processing is selected, at least one preview image indicating the staple positions is displayed.

Figure 7:
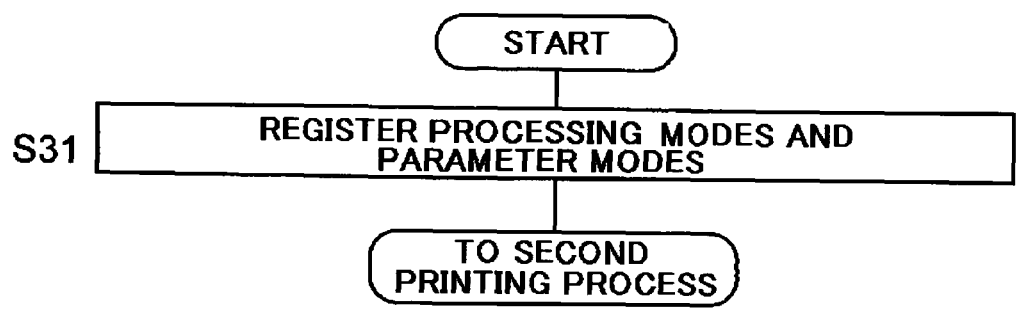
FIG. 7 is a flow chart to describe the pre-processing required in order to execute a second printing process.

Because the hardware construction of the multifunction peripheral 1 according to the Embodiment 2 is identical to the construction shown in FIG. 2, it will not be described herein. The second printing process executed by the multifunction peripheral 1 according to the Embodiment 2 will be described below. FIG. 7 is a flow chart to describe the pre-processing required to execute the second printing process. First, as shown in FIG. 7, multiple processing modes according to the types of printing processes and after-processing operations, as well as parameter modes establishing detailed settings for each of these processing modes, are stored in advance in the ROM 14 serving as a settings memory (step S31). After this pre-processing is completed, the CPU 13 carries out the second printing process in accordance with the control program 21.

Figure 8:
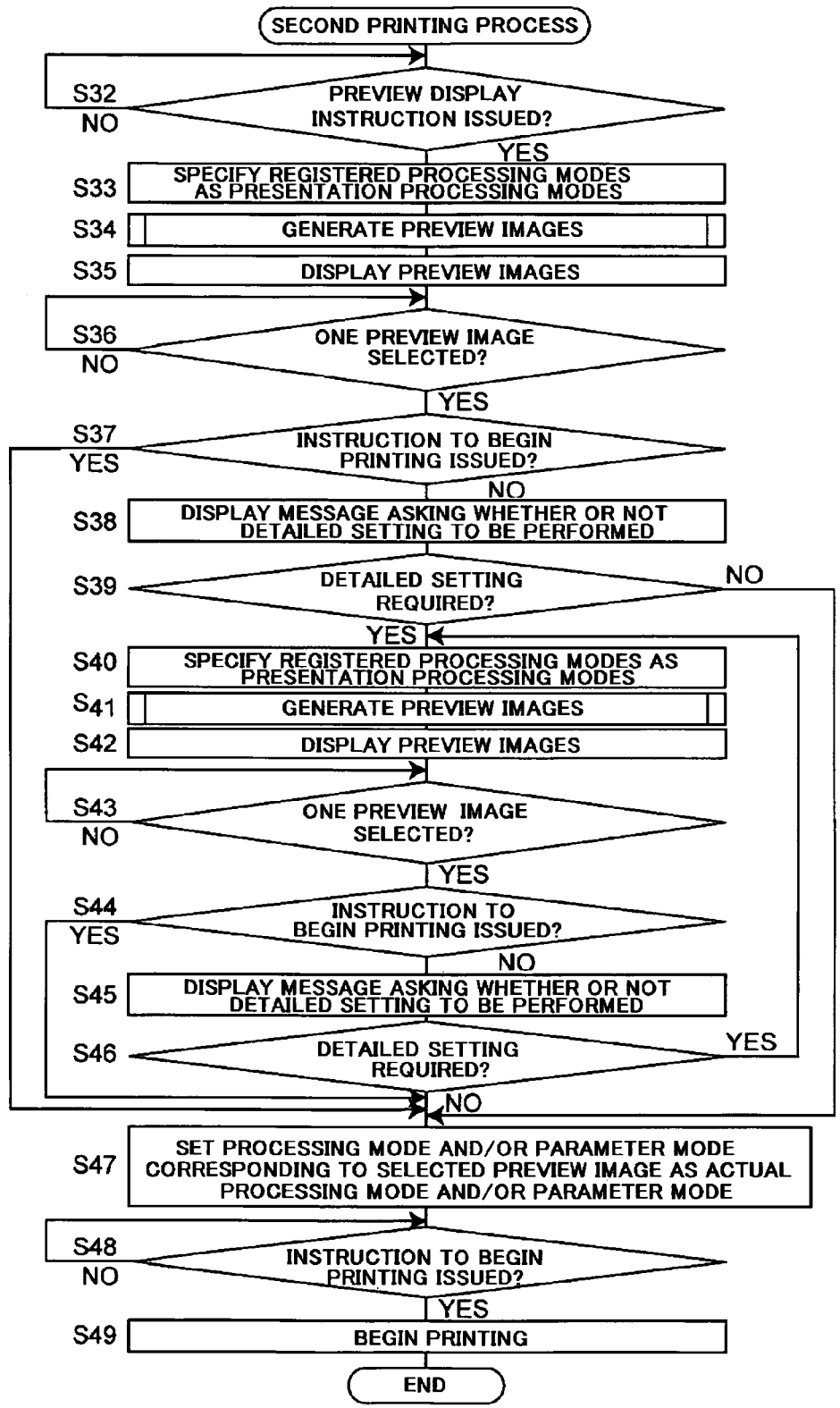
FIG. 8 is a flow chart to describe the second printing process.

FIG. 8 is a flow chart to describe the second printing process. First, the CPU 13 determines whether or not a preview display instruction has been issued (step S32). For example, if the operation key on the operation panel 18 instructing preview display is pressed, it is determined that a preview display instruction has been issued (YES in step S32), the processing modes stored in advance in the ROM 14 (corresponding to the 'registered processing mode storage unit 46' in FIG. 2) are retrieved, and those processing modes are specified as presentation processing modes (step S33). Preview images corresponding to the processing modes specified as presentation processing modes in step S33 are then generated (step S34). The preview images generated in step S34 are referred to as 'presentation preview images' below. This preview image generating process is identical to the preview image generating process shown in FIG. 5.

The presentation preview images generated in step S34 are then displayed on the operation panel 18 (corresponding to the 'display unit 37' in FIG. 2) (step S35). The user can select one of the displayed presentation preview images using the operation panel 18. These presentation preview images are continuously displayed so long as none of them is selected by the user (NO in step S36), but if the user selects one of these presentation preview images (YES in step S36), it is determined whether or not the user has instructed commencement of the printing process from the operation panel 18 (step S37). If the user has input an instruction to begin the printing process (YES in step S37), the CPU 13 advances to step S47. If the user does not input an instruction to begin the printing process for a prescribed period of time (NO in step S37), a message asking the user if he wants to make detailed settings regarding the selected processing mode is displayed on the operation panel 18 (step S38). If input indicating that the user will not make detailed settings is received (NO in step S39), the CPU 13 advances to step S47. If input indicating that the user will make detailed settings is received (YES in step S39), the CPU 13 proceeds to step S40 wherein it retrieves the parameter modes corresponding to the selected processing mode from the ROM 14 and specifies these parameter modes as presented parameter modes (step S40). The message asking the user if he wants to make detailed settings is issued in step S38, but may be displayed in step S35 instead together with the presentation preview images. In this case, step S38 may be omitted.

Next, the CPU 13 (corresponding to the 'preview image generator 36' in FIG. 2) generates preview images corresponding to the parameter modes specified as presented parameter modes in step S40 (step S41). The preview images generated in step S41 will be described as 'parameter preview images' below. These parameter preview images are preview images that show the setting results when the first preview image is set using each parameter mode. Specifically, the presentation preview image selected in step S36 is synthesized with the parameter image data corresponding to each parameter mode stored in the ROM 14. This preview image generating process is identical to the preview image generating process shown in FIG. 5, with 'processing mode' and 'default image data' corresponding to 'parameter mode' and 'presentation preview image data'. The CPU 13 also displays the parameter preview images generated in step S41 on the operation panel 18 (step S42). The user can select one of the displayed parameter preview images using the operation panel 18. The CPU 13 continuously displays the parameter preview images so long as the user does not select a parameter preview image (NO in step S43), and if the user does select a parameter preview image (YES in step S43), it is determined whether or not the user has input an instruction from the operation panel 18 to begin the printing process (step S44). When the user has input an instruction to begin the printing process (YES in step S44), the CPU 13 advances to step S47. If the user does not input an instruction to begin the printing process for a prescribed period of time (NO in step S44), a message asking whether or not detailed settings will be made is displayed to the user via the operation panel 18 in connection with the selected parameter mode (step S45). If input is performed by the user indicating that detailed setting will not be carried out (NO in step S46), the CPU 13 advances to step S47. If input is performed by the user indicating that detailed setting will be carried out (YES in step S46), the CPU 13 returns to step S40 and the steps from S40 to S46 are repeated. In step S47, the processing mode and/or parameter mode corresponding to the selected preview image is set as the processing mode and/or parameter mode for actual processing (step S47). Next, if the user has input an instruction from the operation panel 18 to begin the printing process (YES in step S48), the printer unit 29 is caused to begin the printing process using the user-selected processing mode and/or parameter mode (step S49), whereupon this series of processes ends.

Figure 9:
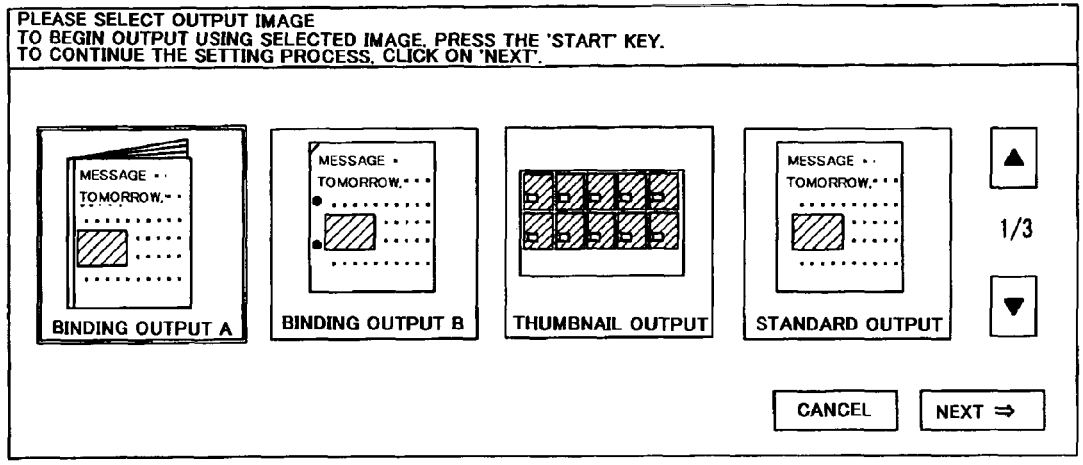
FIG. 9 is an example of the display of presentation preview images displayed during the second printing process.

FIG. 9 shows an example of the display of the presentation preview images displayed in step S35. As shown in FIG. 9, preview images corresponding to various processing modes such as binding output and thumbnail output are displayed. In the display example of FIG. 9, both preview images and a message stating 'To continue the setting process, click on 'Next', i.e., a message asking whether or not detailed settings are to be made, are displayed. In the example displayed in FIG. 9, when the 'Start' key on the operation panel 18 (not shown) is pressed, it is determined that an instruction to begin the printing process has been input by the user (YES in step S37), and if the user clicks on the 'Next' key, it is determined that the user has performed input indicating that detailed settings are to be made (YES in step S39).

Figure 10:
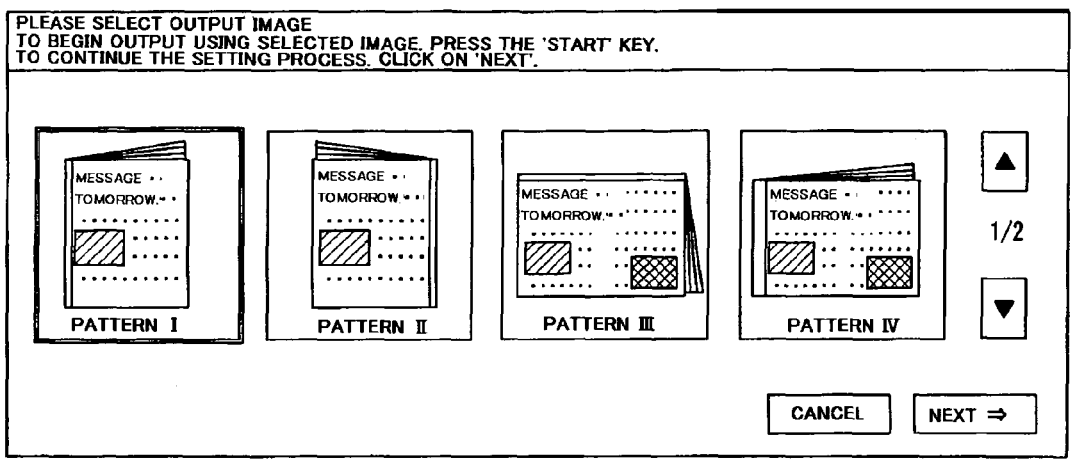
FIG. 10 is an example of the display of parameter preview images displayed during the second printing process.

FIG. 10 shows an example of the display of the preview images displayed in step S42. The display example shown in FIG. 10, is the display example resulting when 'Binding output A' is selected by the user from the display example shown in FIG. 9. As shown in FIG. 10, preview images corresponding to multiple parameter modes pertaining to the binding output format are displayed. For example, 'Pattern I' and 'Pattern II' indicate left binding and right binding, respectively, while 'Pattern III' and 'Pattern IV' indicate '2 in 1' top binding and '2 in 1' left binding, respectively. In the display example shown in FIG. 10, if the 'Start' key on the operation panel 18 (not shown) is pressed, it is determined that the user has input an instruction to begin the printing process (YES in step S44), while if the 'Next' key is clicked on, it is determined that input indicating that further detailed setting is to be carried out by the user was performed (YES in step S46).

In the multifunction peripheral 1 according to this Embodiment 2 as well, as in the multifunction peripheral 1 according to the Embodiment 1, because the user sets the processing mode or parameter mode by (i) where only one processing mode or parameter mode is presented, confirming that processing mode or parameter mode, and (ii) where multiple processing modes or parameter modes are presented, selecting one of the displayed presentation processing modes or parameter modes, the processing mode or parameter mode can be easily and quickly set. Furthermore, because the user can select the processing mode or parameter mode while verifying a finished expected image, deviations between the processing result expected by the user and the processing result from actual processing can be prevented.

In the second printing process shown in FIG. 8, the same processing modes and parameter modes are presented to all users, but it is acceptable if different processing modes and parameter modes are presented to each user. In this case, steps in which (i) the user information shown in FIG. 3 is stored, (ii) the user authentication shown in FIG. 4 is carried out, and (iii) the processing modes and parameter modes set by the user are stored and associated with that user as user job history, may be added.

While in the multifunction peripheral 1 according to the Embodiment 1, user setting is carried out once, it is acceptable if in the multifunction peripheral 1 according to the Embodiment 2, the user sets the processing mode and the parameter mode in stages. It is furthermore acceptable if the processing mode set in the Embodiment 1 defines the type of processing and parameter value prescribed by the processing mode and the parameter mode in the Embodiment 2, respectively. In other words, the processing mode to be set in the Embodiment 1 may define all parameters from the overall processing such as binding output to detailed settings such as the binding positions, for example.

Embodiment 3

The image processing apparatus according to an Embodiment 3 of the present invention will now be described. In the image processing apparatus according to the Embodiment 3, if an error occurs while actual processing is being carried out using the processing mode set by the user, at least one processing mode that may be selected in order to clear this error is presented to the user. Here, the case in which an error occurs when actual processing is being carried out will be described. This error occurs while a job is being executed in the set processing mode or prior to such execution (including during setting of the processing mode and when the job start button is pressed after such setting is completed), and consists of a situation wherein the job cannot be executed in the set processing mode, and can only be executed by changing some of the parameter settings. In general, a multifunction peripheral includes many functions and various processing modes can be set, but where an exclusive mode or parameter value is selected or a certain mode or parameter value is selected, the options that are ordinarily selectable in other modes become limited due to factors intrinsic to the multifunction peripheral or due to other factors. Such a limitation can occur not only prior to job execution (during setting) but also during job execution. As a result, in the image processing apparatus according to the Embodiment 3, if one of these types of errors occurs, it is deemed to occur during actual processing. Specifically, an error occurs when the paper housed in the designated paper supply tray is inappropriate to the set processing mode or when the paper runs out during printing, for example.

Figure 11:
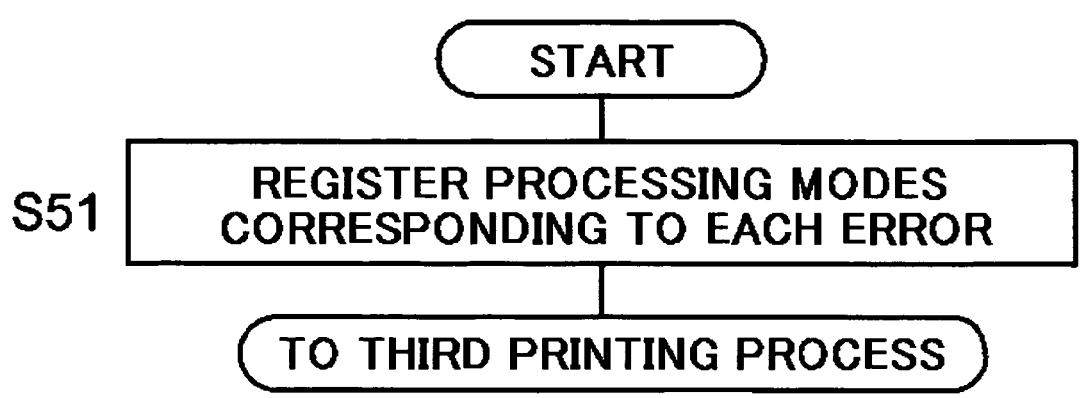
FIG. 11 is a flow chart to describe the pre-processing required in order to execute a third printing process.

Because the hardware construction of the multifunction peripheral 1 according to the Embodiment 3 is identical to the construction shown in FIG. 2, description thereof will be omitted. A third printing process executed by the multifunction peripheral 1 according to the Embodiment 3 will now be described. In this third printing process, when an error occurs during printing of an image using the set processing mode, printing is executed after the error is cleared. In the discussion below, a situation is described in which the error consists of the fact that, where a processing mode specifying two-point stapling and a paper tray are set by the user, the paper in the paper tray is not of a size that permits two-point stapling. FIG. 11 is a flow chart describing the pre-processing required to clear this error. As shown in FIG. 11, first, errors that can occur during image processing and the processing modes that can be selected in order to clear each error are associated and stored in the ROM 14 serving as a settings memory (step S51). When this pre-processing is completed, the CPU 13 executes the third printing process based on the control program 21.

Figure 12:
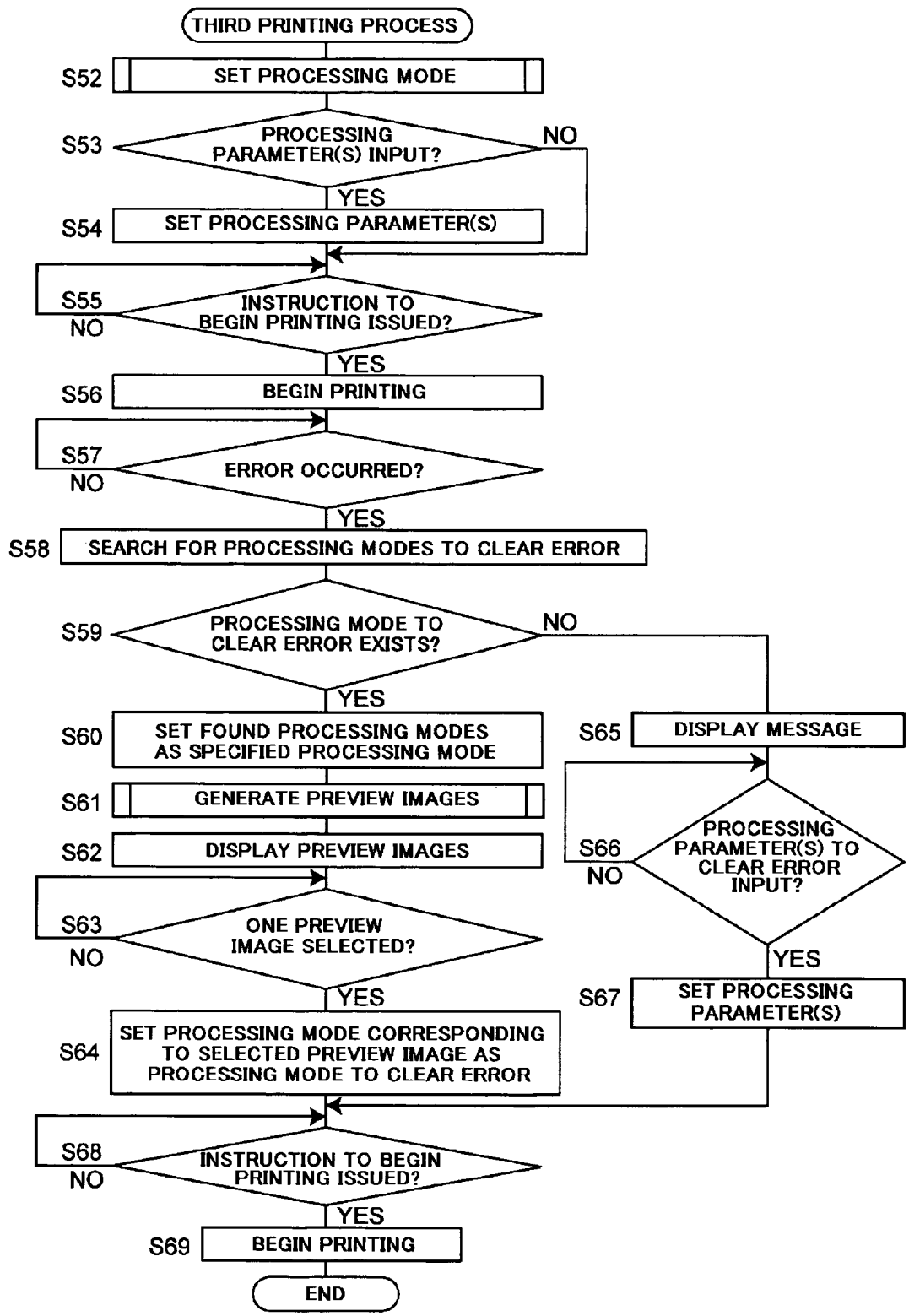
FIG. 12 is a flow chart to describe the third printing process.

FIG. 12 is a flow chart to describe the third printing process. First, the processing mode is set via the processing mode setting process (step S52). Here, the processing mode setting process is the process comprising steps S3 to S17 of FIG. 4 or steps S32 to S47 of FIG. 10, for example. Furthermore, when other processing parameter values such as the paper tray are input by the user using the operation panel 18 (corresponding to the 'input unit 36' in FIG. 2) (YES in step S53), the input processing parameter values are set as actual processing parameter values (step S54). Next, if an instruction to begin the printing process is input by the user from the operation panel 18 (YES in step S55), the printing unit 29 is caused to begin the printing process under the user-selected processing mode and printing parameter values (step S56).

Here, if a warning signal is input from the printing unit 29 (corresponding to the 'printing unit 38' in FIG. 2) indicating the occurrence of an error, i.e., indicating that paper of a size incompatible with two-point stapling is stored in the designated paper tray (YES in step S57), the CPU 13 searches for the processing modes to clear this error from within the ROM 14 (step S58). Where processing modes to clear the error exist within the ROM 14 (YES in step S59), the processing modes found as a result of the search are specified as specified processing modes (step S60). Next, preview images corresponding to each of the processing modes specified as specified processing modes ('specified preview images') in step S60 are generated (step S61). This preview image generating process is identical to the preview image generating process shown in FIG. 5. The operation panel 18 (corresponding to the 'display 37' in FIG. 2) is then caused to display the preview images (step S62).

The user can select one of the displayed preview images using the operation panel 18. The preview images are continuously displayed so long as the user does not select a preview image (NO in step S63), and when a preview image is selected by the user (YES in step S63), the processing mode corresponding to the selected preview image is set as the processing mode to clear the error that occurred (step S64), whereupon the CPU 13 advances to step S68.

On the other hand, if in step S59 a processing mode to clear the error does not exist in the ROM 14 (NO in step S59), the operation panel 18 (corresponding to the 'display unit 37' in FIG. 2) is caused to display a message indicating the nature of the error (step S65). If a processing parameter value to clear the error is input by the user using the operation panel 18, for example if a different paper tray is specified (YES in step S66), the input processing parameter value is set (step S67). If an instruction to begin the printing process is then input by the user from the operation panel 18 (YES in step S68), the printing unit 29 (corresponding to the 'printing unit 38 in FIG. 2) is caused to begin the printing process under the set processing mode and printing parameter values (step S69).

Figure 13:
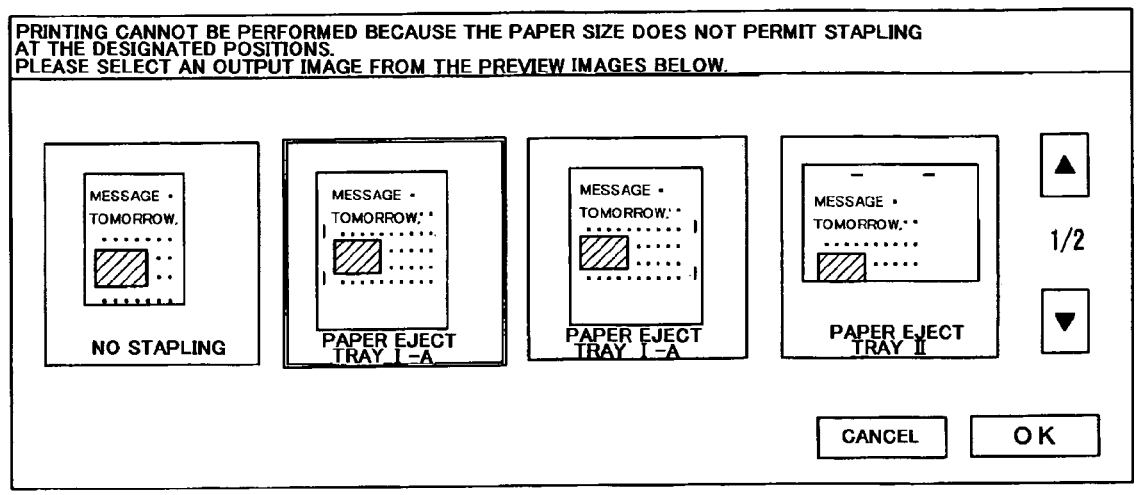
FIG. 13 is an example of the display of specified preview images displayed during the third printing process.

FIG. 13 is an example of the display of the preview images displayed in step S62. As shown in FIG. 13, where paper having a size that does not permit two-point staple printing is placed in the designated paper tray, one or more of the processing modes that enable the error to be cleared is displayed. For example, a mode that performs printing only after two-point stapling is cleared ('No stapling'), modes that execute two-point stapling using a different paper tray ('Paper tray I-A', 'Paper tray I-B', or 'Paper tray II') and the like are displayed.

In the multifunction peripheral 1 according to the Embodiment 3, when an error occurs, the processing modes that can clear the error are presented by displaying the preview images indicating the results of processing when the image data is processed using those processing modes. Because the user can set the processing mode by selecting one of the presented processing modes, errors can be easily and quickly cleared. Furthermore, because the user can select the processing mode while verifying a finished expected image, the processing mode deemed most appropriate by the user can be selected from among the processing modes that can clear the error. In the image processing apparatus according to this Embodiment 3, possible errors are stored together with the processing modes that may be executed in order to clear these errors, but in this case, because the stored processing modes are those that can clear the error if changed, as described above, processing modes having no connection to error clearing remain unchanged in accordance with their previous setting.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

For example, in the image processing apparatus according to the Embodiments 1 through 3 above, the processing mode selected and set from the preview images may represent one processing function, but it is preferred that the selected processing mode represent parameters corresponding to various different processing functions (such as a stapling function and two-sided printing function), and even more preferred that it represents all parameters required by the image processing apparatus when executing a job. The parameter values described here refer to settings indicating whether or not the processing function corresponding to the parameter is ON or OFF, i.e., whether or not the processing function is set, as well as to detailed settings applicable when the processing function is set. The processing mode need not include all parameters required by the multifunction peripheral for job execution, and where only some of such parameters are registered, default values, for example, may be used for non-registered values.

What is claimed is:

1. A user interface device for setting in an image processing apparatus a processing mode to execute a job, comprising:
   a specifying unit that specifies one or more processing modes to be presented to a user without selection of the processing modes by the user as presentation processing modes, wherein the specified one or more processing modes correspond to a part of all processing modes that can be set in the image processing apparatus, and wherein the processing modes are specified based in part on a user's selection history;
a generating unit that generates one or more presentation preview images showing the results of processing of image data using the presentation processing modes;
a display unit that displays the one or more presentation preview images;
a selection unit configured to enable the user to select one presentation preview image from the displayed presentation preview images; and
a setting unit that sets in the image processing apparatus a processing mode corresponding to the selected presentation preview image.

2. The user interface device according to claim 1, wherein the specifying unit specifies the one or more processing modes based on at least one processing mode set at the time of execution of a job by the image processing apparatus prior to specifying by the specifying unit.

3. The user interface device according to claim 1, wherein the specifying unit specifies the one or more processing modes based on at least one processing mode registered in advance in the image processing apparatus.

4. The user interface device according to claim 1, further comprising:
wherein the specifying unit specifies the multiple processing modes as the presentation processing modes, the generating unit generates the presentation preview image for each of the multiple presentation processing modes, the display unit displays the multiple presentation preview images, and the setting unit sets in the image processing apparatus the processing mode corresponding to the presentation preview image selected via the selection unit.

5. The user interface device according to claim 1, wherein each of the one or more processing modes includes multiple parameters corresponding to each of multiple processing functions.

6. The user interface device according to claim 5, wherein each of the one or more processing modes includes all parameters required by the image processing apparatus when executing a job.

7. The user interface device according to claim 1, further comprising:
an error processing storage unit that stores a job error and a processing mode to clear the job error,
wherein the specifying unit specifies depending on an error occurring in the image processing apparatus the processing mode to clear the error as one of the specified processing modes.

8. The user interface device according to claim 1, further comprising:
an error processing storage unit that stores and associates job error and multiple processing modes to clear the job error, and
wherein the specifying unit specifies depending on the error occurring in the image processing apparatus the multiple processing modes to clear the job error as specified processing modes, the generating unit generates the specified preview images for each of the specified multiple processing modes, the display unit displays the generated multiple specified preview images, and the setting unit sets in the image processing apparatus the processing mode corresponding to the specified preview image selected via the selection unit.

9. The user interface device according to the claim 1, further comprising:
a parameter mode storage unit that stores at least one parameter mode that prescribes for each presentation processing mode a detailed setting for that mode,
wherein the generating unit generates parameter preview images that indicate the results of processing when the image data is processed under at least one stored parameter mode in connection with the presentation processing mode corresponding to the presentation preview image selected via the selection unit, the display unit displays at least one generated parameter preview image, the selection unit selects one presentation preview image from among at least one displayed parameter preview image, and the setting unit sets in the image processing apparatus the parameter mode corresponding to the selected parameter preview image.

10. The user interface device according to the claim 1, wherein the generating unit generates the one or more presentation preview images based on image data that is to undergo processing by the image processing apparatus.

11. The user interface device according to the claim 1, wherein the generating unit generates the one or more presentation preview images based on image data stored in advance.

12. The user interface device according to the claim 8, wherein the generating unit generates the specified preview images based on image data that is to undergo processing by the image processing apparatus.

13. The user interface device according to the claim 8, wherein the generating unit generates the specified preview images based on image data stored in advance.

14. The user interface device according to the claim 9, wherein the generating unit generates the parameter preview images based on image data that is undergo to processing by the image processing apparatus.

15. The user interface device according to the claim 9, wherein the generating unit generates the parameter preview images based on image data stored in advance.

16. An image processing apparatus for executing a job, comprising:
a specifying unit that specifies one or more processing modes to be presented to a user without selection of the processing modes by the user as presentation processing modes, wherein the specified one or more processing modes correspond to a part of all processing modes that can be set in the image processing apparatus, and wherein the processing modes are specified based in part on a user's selection history;
a generating unit that generates one or more presentation preview images showing the results of processing of image data using the presentation processing modes;
a display unit that displays the one or more presentation preview images;
a selection unit configured to enable the user to select one presentation preview image from the displayed presentation preview images;
a setting unit that sets in the image processing apparatus a processing mode corresponding to the selected presentation preview image; and
an executing unit configured to execute a job with the processing mode set by the setting unit.

17. A processing mode setting method that sets in an image processing apparatus the processing mode to execute a job, comprising:
specifying one or more processing modes to be presented to a user without selection of the processing modes by the user as presentation processing modes, wherein the specified one or more processing modes correspond to a part of all processing modes that can be set in the image processing apparatus, and wherein the processing modes are specified based in part on a user's selection history, generating one or more presentation preview images showing the results of processing of the image data using the presentation processing modes, displaying the one or more generated presentation preview images in a display, selecting one presentation preview image from the displayed presentation preview images, and setting the image processing apparatus to the processing mode corresponding to the selected displayed presentation preview image.

18. The processing mode setting method according to the claim 17, wherein specifying one or more processing modes to be presented to a user comprises specifying the presentation processing modes based on at least one processing mode set at the time of execution of a job by the image processing apparatus prior to specifying the presentation processing mode.

19. The processing mode setting method according to the claim 17, wherein specifying one or more processing modes to be presented to a user comprises specifying the presentation processing modes based on at least one processing mode registered in advance in the image processing apparatus.

20. The processing mode setting method according to the claim 17, comprising generating presentation preview images based on image data stored in advance.

21. The processing mode setting method according to the claim 17, wherein the processing modes include parameter values corresponding to each of the multiple processing functions.

22. The processing mode setting method according to the claim 21, wherein the processing modes include all parameter values required by the image processing apparatus when executing a job.

23. The processing mode setting method according to the claim 17, further comprising:

storing and associating job errors with processing modes to clear those errors, wherein specifying processing modes to be presented to the user comprises specifying, depending on the error occurring in the image processing apparatus, processing modes to clear the error as specified processing modes.

24. The processing mode setting method according to claim 17, further comprising:

storing and associating job errors and multiple processing modes to clear these errors, specifying, depending on the error occurring in the image processing apparatus, multiple processing modes to clear such error as specified processing modes, generating a specified preview image for each of the specified multiple specified processing modes, displaying the generated multiple specified preview images, one specified preview image from among the displayed multiple specified preview images, and setting in the image processing apparatus the processing mode corresponding to the specified preview image selected via the selection unit.

25. The processing mode setting method according to the claim 17, further comprising:

storing at least one parameter mode that prescribes for each presentation processing mode a detailed setting for that mode, generating parameter preview images that indicate the results of processing when the image data is processed under at least one stored parameter mode in connection with the presentation processing mode corresponding to the selected presentation preview image, displaying at least one generated parameter preview image, selecting one parameter preview image from among at least one displayed parameter preview image, and setting in the image processing apparatus the parameter mode corresponding to the selected parameter preview image.

26. The processing mode setting method according to the claim 17, comprising generating presentation preview images based on image data that is to undergo processing by the image processing apparatus.

27. The processing mode setting method according to the claim 23, comprising generating the specified preview images based on image data stored in advance.

28. The processing mode setting method according to the claim 23, comprising generating the specified preview images based on image data that is to undergo processing by the image processing apparatus.

29. The processing mode setting method according to the claim 25, comprising generating the parameter preview images based on image data stored in advance.

30. The processing mode setting method according to the claim 25, comprising generating the parameter preview images based on image data that is to undergo processing by the image processing apparatus.

* * * * *